(12) United States Patent
Marshall et al.

(10) Patent No.: US 11,582,110 B2
(45) Date of Patent: Feb. 14, 2023

(54) TECHNIQUES FOR SHARING DEVICE CAPABILITIES OVER A NETWORK OF USER DEVICES

(71) Applicant: Apple Inc., Cupertino, CA (US)

(72) Inventors: Scott M. Marshall, Los Altos, CA (US); Jeremy A. Wyld, San Diego, CA (US); Jiten L. Mehta, Milpitas, CA (US); Darren Litzinger, Los Gatos, CA (US); John J. Iarocci, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/698,532

(22) Filed: Mar. 18, 2022

(65) Prior Publication Data

US 2022/0303185 A1 Sep. 22, 2022

Related U.S. Application Data

(60) Provisional application No. 63/164,494, filed on Mar. 22, 2021.

(51) Int. Cl.
| | | |
|---|---|---|
| G06F 15/173 | (2006.01) | |
| H04L 41/12 | (2022.01) | |
| H04L 41/14 | (2022.01) | |
| H04L 41/0893 | (2022.01) | |
| H04L 41/085 | (2022.01) | |

(52) U.S. Cl.
CPC ............ *H04L 41/12* (2013.01); *H04L 41/085* (2013.01); *H04L 41/0893* (2013.01); *H04L 41/14* (2013.01)

(58) Field of Classification Search
CPC ... H04L 41/12; H04L 41/085; H04L 41/0893; H04L 41/14
See application file for complete search history.

(56) References Cited

U.S. PATENT DOCUMENTS

| | | | |
|---|---|---|---|
| 6,349,352 B1 | 2/2002 | Lea | |
| 7,664,081 B2 | 2/2010 | Luoma et al. | |
| 10,257,696 B2 | 4/2019 | Patil et al. | |
| 10,594,566 B2 | 3/2020 | Wu | |
| 2009/0177743 A1* | 7/2009 | Ashour | H04L 12/1831 709/204 |
| 2015/0278343 A1* | 10/2015 | Rangwala | H04L 67/10 707/737 |
| 2020/0244728 A1* | 7/2020 | Jha | H04L 67/1093 |

* cited by examiner

*Primary Examiner* — Padma Mundur
(74) *Attorney, Agent, or Firm* — Kilpatrick, Townsend & Stockton

(57) ABSTRACT

Techniques are disclosed for generating device cluster capability information for a cluster of devices in a network environment. Capability information can specify capabilities of the devices in the cluster. A first user device can generate device capabilities for the first user device and obtain device capabilities for other devices in the cluster. The first user device can generate cluster capability information providing an intersection of the first set of device capabilities and device capabilities of the other user devices in the cluster. The first user device can obtain cluster capability information for other clusters in the network environment and receive a request from a service user device to perform a specific task. The first user device can transmit cluster capability information relating to a selected cluster that corresponds with the request.

20 Claims, 8 Drawing Sheets

TECHNIQUES FOR SHARING DEVICE CAPABILITIES OVER A NETWORK OF USER DEVICES

CROSS-REFERENCE TO RELATED APPLICATION(S)

The present application claims priority to U.S. Provisional Patent Application No. 63/164,494, titled "TECHNIQUES FOR SHARING DEVICE CAPABILITIES OVER A NETWORK OF USER DEVICES," and filed Mar. 22, 2021, the entirety of which is incorporated by reference herein.

BACKGROUND

Many network environments include multiple devices capable of performing various processing tasks. For example, a network environment can include a combination of computing devices, mobile devices, sensors, internet of things (IoT) devices, etc. In some instances, the devices in a network environment can be separated into clusters of devices within the network environment and assigned to a leader within each cluster. One or more of the clusters can work together to manage an automated environment within the network. However, given the many various types of devices and processing tasks, many challenges exist in managing the automated environment.

SUMMARY

Some embodiments of the present disclosure can provide methods, systems, and computer-readable media for generating capability information relating to a cluster of user devices. Capability data of multiple clusters of user devices in a network environment can be used to select a cluster for performance of a task.

According to one embodiment, a method is disclosed. The method can include identifying, by a first user device of a plurality of user devices in a first cluster of a plurality of clusters in a network, that the first user device is a leader user device of the first cluster. The first user device can also be part of a second cluster of the plurality of clusters in the network. The method can also include deriving, by the first user device, a first set of device capabilities that correspond to the first user device.

The method can also include receiving, from other user devices of the first cluster, a plurality of respective other sets of device capabilities that each correspond to one of the other user devices of the first cluster. The method can also include generating, by the first user device, a cluster capability comprising an intersection of the first set of device capabilities that correspond to the first user device and each of the plurality of respective other sets of device capabilities that each correspond to one of the other user devices.

The method can also include receiving, from a second user device in the second cluster, a second generated cluster capability for the second cluster. The second user device can be configured to be a second leader of the second cluster. The method can also include receiving, by the first user device, a request from a service user device. In some instances, the method can also include notifying, by the first user device, the service user device of the generated cluster capability for the first cluster. This can be performed in accordance with the request corresponding to the first cluster. In other instances, the method can also include notifying, by the first user device, the service user device of the second generated cluster capability for the second cluster. This can be performed in accordance with the request corresponding to the second cluster.

DETAILED DESCRIPTION

Figure 1:
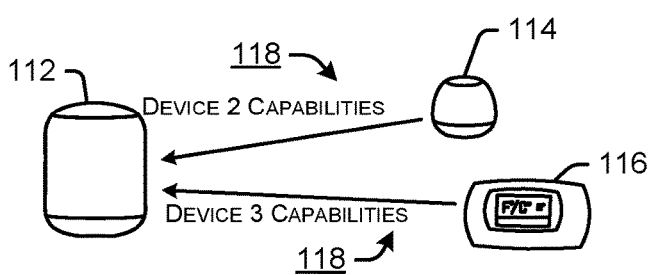
FIG. 1 illustrates a flow process for deriving device cluster capability information for a cluster of devices in a network environment, according to some embodiments.
Figure 1:
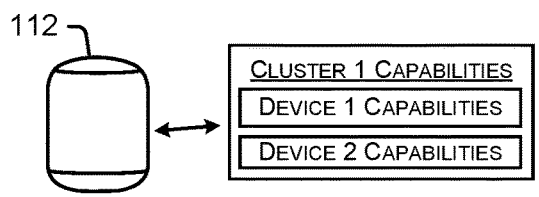
Figure 1:
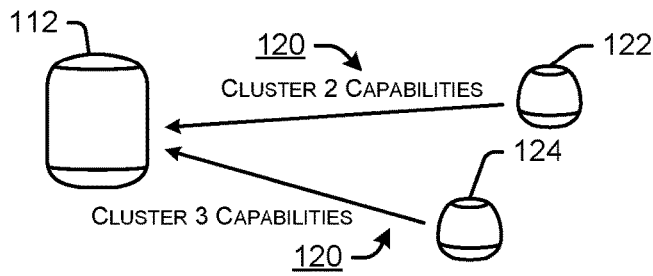
Figure 1:
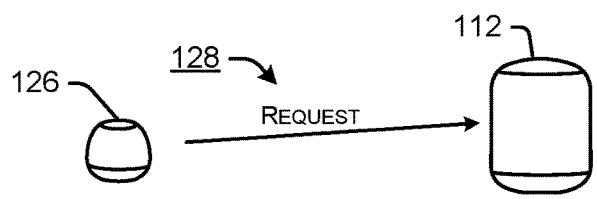
Figure 1:
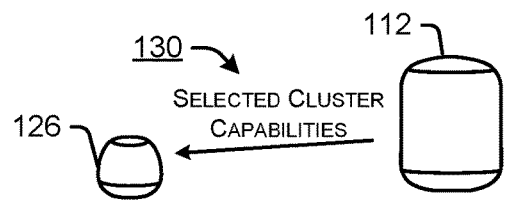
Figure 1:
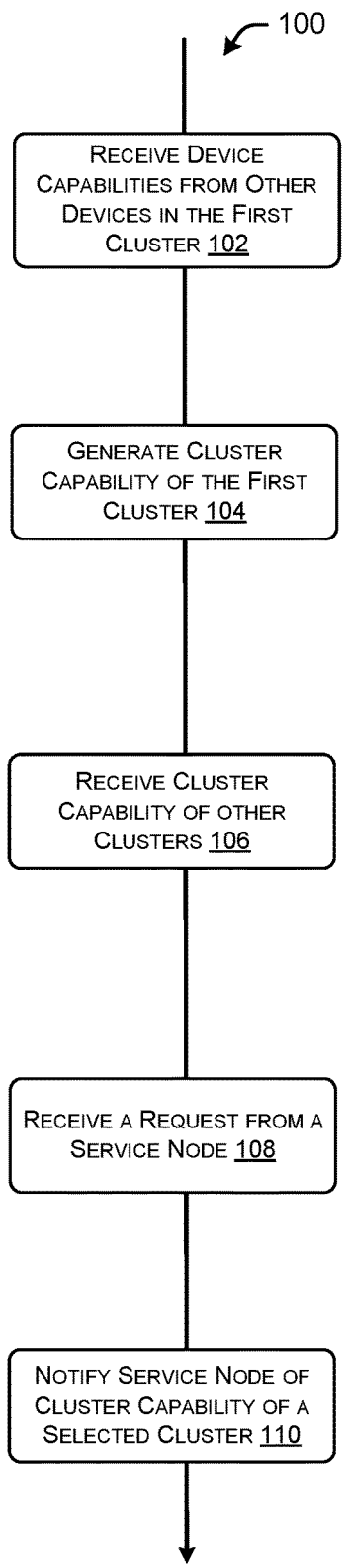

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

The present embodiments relate to deriving device cluster capability information for a cluster of devices in a network environment. Capability information can specify capabilities (e.g., processing capabilities, network transmission capabilities, classes of devices, applications executing on the devices, etc.) of the devices in the cluster. The cluster capability information can be used for selection of a cluster to execute requests provided by a service user device. The cluster capability information can also be used to selecting applications/features to be activated/enabled in the cluster.

A cluster can include a number of associated devices (e.g., network-accessible devices, internet of things (IoT) devices, sensors, mobile phones, computing devices, etc.)) in a network environment (e.g., home, building, etc.). The network environment can include a number of clusters, where each cluster includes a leader device (e.g., a device performing specific processing tasks, coordinating state information of devices in the cluster, etc.). The first user device can derive a set of device capabilities for the first user device. The device capabilities for the first user device can specify various capabilities (e.g., power capabilities, processing capabilities, network capabilities, features of the device, etc.) specific to the first user device.

As an illustrative example, a first user device (e.g., a smart home device) can derive cluster capability information for a set of devices in the cluster. The cluster capability information can comprise an intersection of device capabilities that correspond to the first user device and device capabilities of the other user devices in the cluster. The intersection of device capabilities can specify various capabilities of the devices in the cluster, such as a maximum processing power of the devices in the cluster, a device capable of processing or rendering 4K video data, or other software features of devices in the cluster, for example. In some examples, the intersection for each type of capability may include the maximum amount (e.g., highest level) of that capability that is common among the devices in the cluster. For example, if only three out of four devices in the cluster have audio output capabilities, then the intersection for this type of capability (e.g., audio output) would be "none." In other words, the cluster does not have audio output capabilities because the intersection (e.g., the maximum in common for that type) does not include a value. In another example, if all four devices have audio output, but only two have stereo (e.g., the other two only have mono), then the intersection would be "mono" since stereo might be considered a higher level of audio output and not all devices in the cluster have stereo. If one of the mono devices were removed from the cluster, the intersection would still be mono. However, if both mono devices were removed from the cluster, when the intersection was recalculated, the cluster would now list "stereo" as its capability for the audio output type.

In another example, an intersection can be evaluated for each level of a capability type (as opposed to just analyzing the maximum levels). For example, following the above example, the intersection of level "mono" for type "audio output" may be calculated for the set of devices in the cluster, and separately, the intersection of level "stereo" for type "audio output" may be calculated for the set of devices in the cluster. When the intersection includes "mono" for all devices, then "mono" is one capability for that cluster. If the intersection also includes "stereo" for all devices, then "stereo" is another capability for that cluster. However, if just one device in the cluster does not have "stereo" capabilities, then the only value for "audio output," in this example, may be "mono." Thus, the determined capabilities for that cluster would only include "mono." Of course, various other combinations of levels and capabilities are envisioned, as desired.

The first user device can be a leader device of a first cluster and also be part of a second cluster. A user device comprising a leader device for a cluster can be a leader device for one or more other clusters in the network environment. The different clusters can include differing capabilities specific to devices in each cluster. The first user device can obtain capability information specific to each cluster that specifies an intersection of capabilities unique to each cluster of devices. The first user device can process a request from a service user device node (e.g., a request to process 4K video data from a computing device external to a network). The first user device can compare parameters included in the request (e.g., a parameter to render 4K video data) with capabilities of the clusters to identify a cluster for performing the request. In this example, if the first cluster includes a video streaming device capable of rendering 4K video data, the first cluster can be selected to perform the request and the cluster capability information of the first cluster can be sent to the service user device.

Additionally, in some examples, a particular device in two separate clusters may be associated with different capabilities (e.g., by respective cluster leaders) for any given capability type based on the respective clusters' intersections. For example, using the above example, a particular device may have stereo audio output capabilities. However, the device may also be able to play mono (e.g., it may be possible that most devices with multiple speakers can play stereo or mono, depending on the input audio source). Thus, if this device with both stereo and mono capabilities is included in two separate clusters, it may end up being associated with different capabilities depending on the other devices in each cluster. For example, as discussed above, this device may be included in a cluster with three other devices, where one is stereo and the other two are mono. For this first cluster, the intersection would be "mono," so this device would be associated with "mono" for this cluster. However, the particular device in question may also be in another cluster, where all of the other devices have stereo capabilities. In this case, the particular device that is associated with "mono" in the first cluster would be associated with "stereo" in the second cluster because the intersection for the second cluster is clearly stereo.

FIG. 1 illustrates a flow process 100 for deriving device cluster capability information for a cluster of devices in a network environment. At block 102, the first user device 112 can receive device capability data 118 (e.g., device 2 capabilities, device 3 capabilities) relating to device 114 and device 116 (e.g., a smart home device, a speaker, a video streaming device, a sensor, an internet of things (IoT) device)) in the first cluster. The device capability data can specify capabilities of the other devices in the first cluster.

At block 104, the first user device 112 can generate cluster capability information based on the set of device capabilities for the first user device and the received device capability data of the other user devices in the first cluster. The cluster capability information can provide an intersection of the first set of device capabilities that correspond to the first user device and each of the plurality of respective other sets of device capabilities that each correspond to one of the other user devices. For example, the cluster capability information can specify types of devices in the first cluster (e.g., mobile phones, video-enabled devices, devices with audio capabilities), network throughput capabilities, processing capabilities, etc.

At block 106, the first user device 112 can receive generated cluster capabilities 120 for other clusters from other devices (e.g., leader device 2 122, leader device 3 124)

of the other clusters in the network environment. The generated cluster capabilities for the other clusters can specify capabilities unique to each other cluster of the network environment. In some embodiments, devices in the cluster can be notified of the current set of capabilities supported by the cluster from the leader device. The leader device can send a notification to the cluster devices any time the cluster capability information changes.

At block 108, the first user device 112 can receive a request 128 from a service user device 126 (e.g., a mobile device in the network environment, a computing device external to the network environment). The request can include the service user device 126 registering an observer specifying a capability and the registered observer can provide a notification anytime the availability of the cluster changes. In some cases, a service user device (e.g., like service user device 126) is a controller device. A controller device can be any type of electronic device configured to provide control instructions to one or more other devices (e.g., accessory devices) within the network environment (e.g., the home). A controller device can be a mobile device (e.g., a smart phone with cellular and/or Wi-Fi capabilities) or it can be a computing device external to the network environment (e.g., a smart phone not in the home, or a server). Additionally, some controller devices may be associated with one or more service user devices (e.g., a voice command service user device, a home control service user device, an identity management service user device, a voice recognition service user device, or the like). The request can include a request to perform a task or communicate specific data with various parameters. For example, the request can specify a processing capability to perform the request or a specific device type (e.g., a video-enabled device) to perform the request.

At block 110, the first user device 112 can transmit cluster capability information relating to a selected cluster 130 to the service user device 126. The first user device 112 can also notify the service user device of the cluster capabilities for a cluster that corresponds with the request. In response, data relating to the request can be provided from the service user device to the leader device of the cluster that corresponds with the request.

The present embodiments allow for selective transmission of requests to a cluster to perform various tasks based on capabilities unique to the cluster. Accordingly, clusters in a network environment with capabilities that best correspond with parameters of a request can handle the request, which can increase the computational efficiency in processing requests.

Additionally, as described in greater detail below, many devices in the clusters can be ephemeral in nature (e.g., devices that have an increased likelihood of leaving a cluster or be unavailable for data processing). In such instances, the leader device can detect devices leaving/entering the cluster and dynamically update the cluster capability information to reflect the new intersection of capabilities of the cluster. The dynamically updated cluster capability information can increase accuracy in identifying a cluster that corresponds with parameters of a request, which can increase the efficiency in processing the request by the cluster.

I. NETWORK ENVIRONMENT

Figure 2:
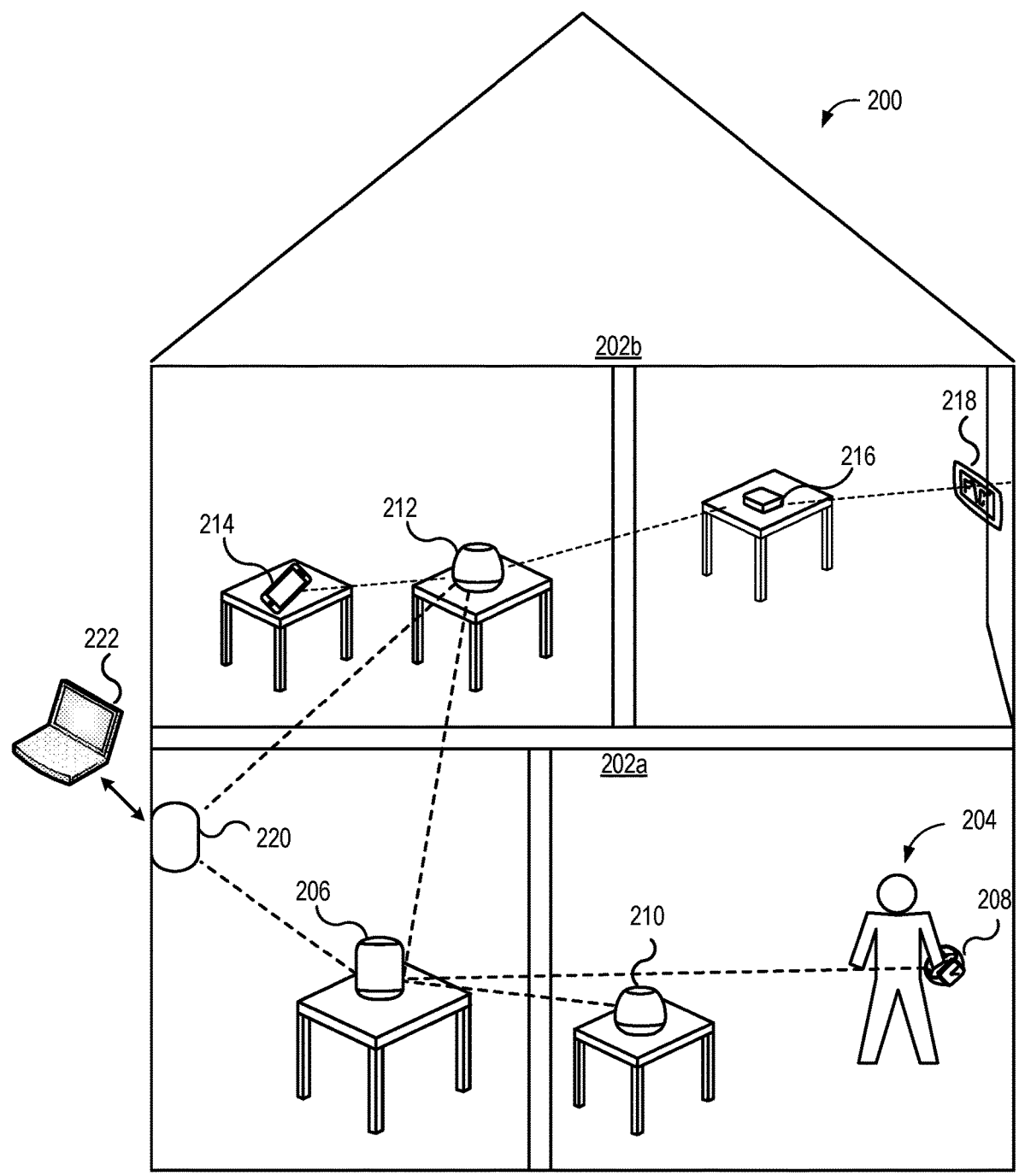
FIG. 2 illustrates a block diagram of an example network environment, according to some embodiments.

FIG. 2 illustrates a block diagram of an example network environment 200. As shown in FIG. 2, the network environment 200 can include multiple clusters (cluster 1 202a, cluster 2 202b). Each cluster can include a subset of network-accessible devices in the network environment 200. In the example as illustrated in FIG. 2, cluster 1 202a can include leader device 206 and devices 208, 210, while cluster 2 202b can include leader device 212 and devices 214, 216, 218. In some instances, a user 204 can interact with one or more devices (e.g., device 208) in the network environment 200.

A cluster can include a number of devices included in a region of the network environment (e.g., a room in a house, a portion of a building) or a cluster can include devices associated with a specific user (e.g., devices associated with an account for a user). The devices in the cluster can interact with other devices in the cluster to forward data between devices (e.g., forming a mesh network). Devices in each cluster can be static in the network environment and the devices can include a lowered likelihood of leaving the network environment (e.g., a video streaming device, thermostat)) and devices that are ephemeral in nature that include devices with an increased likelihood of leaving the network environment (e.g., a mobile phone, laptop computer).

In some embodiments, the devices in the cluster can form a mesh network. For example, device 216 can forward data between devices 212, 218 via the mesh network. The mesh can include a connected graph of user devices that work together to provide a service user device or set of service user devices as a single instance. These service user devices provided by the mesh can be made available then through a separate application programming interface (API) (i.e., clients do not call directly into the mesh, clients call an API abstraction on top of the mesh). To integrate with other subsystems within the network, the cluster can elect a leader which is responsible for maintaining data communication between devices and synchronizing data between devices in the cluster.

Devices can communicate with external networks (e.g., external device 222) via a network interface 220 (e.g., a wireless router). Devices in the network environment can each be capable of communicating with and through a communications network (representing the Internet, wide area networks (WANs), metropolitan area networks (MANs), local area networks (LANs), wireless area networks (WiLANs), radio access network (RANs), public switched telephone network (PTSN), etc., and/or combinations of the same). Devices in the network environment can also communicate directly with other devices in the network environment without utilizing the communications network.

Each cluster can include a leader device. For example, cluster 1 202a can include leader device 206 and cluster 2 202b can include leader device 212. In some instances, a leader device (e.g., 206) can be included in multiple clusters (e.g., 202a, 202b). Leader devices for each cluster can perform specific processing tasks for a cluster, such as direct data between devices in the cluster; coordinate state information of the devices in the cluster; derive cluster capability information as described herein; etc.

In some embodiments, the leader device can be changed from a first device to another device in the cluster responsive to a triggering event (e.g., the leader device leaving the network environment, another device entering the cluster, a time duration expiration). The leader device can be chosen from the user devices in the cluster. The devices in the cluster can include a unique ID that specifies the device and characteristics of the device (e.g., a device type, device class, whether the device is wired or wireless, battery powered, etc.).

The service user device can include a device in a network external to the clusters 202a, 202b. For example, a service user device (e.g., device 222) can include a computing device (e.g., a mobile phone, computing device) requesting a service user device from a cluster in the network environment. As described in greater detail below, the request for a service user device can include a request for a processing task to be performed by a cluster with capability information that corresponds with parameters of the request.

Figure 3:
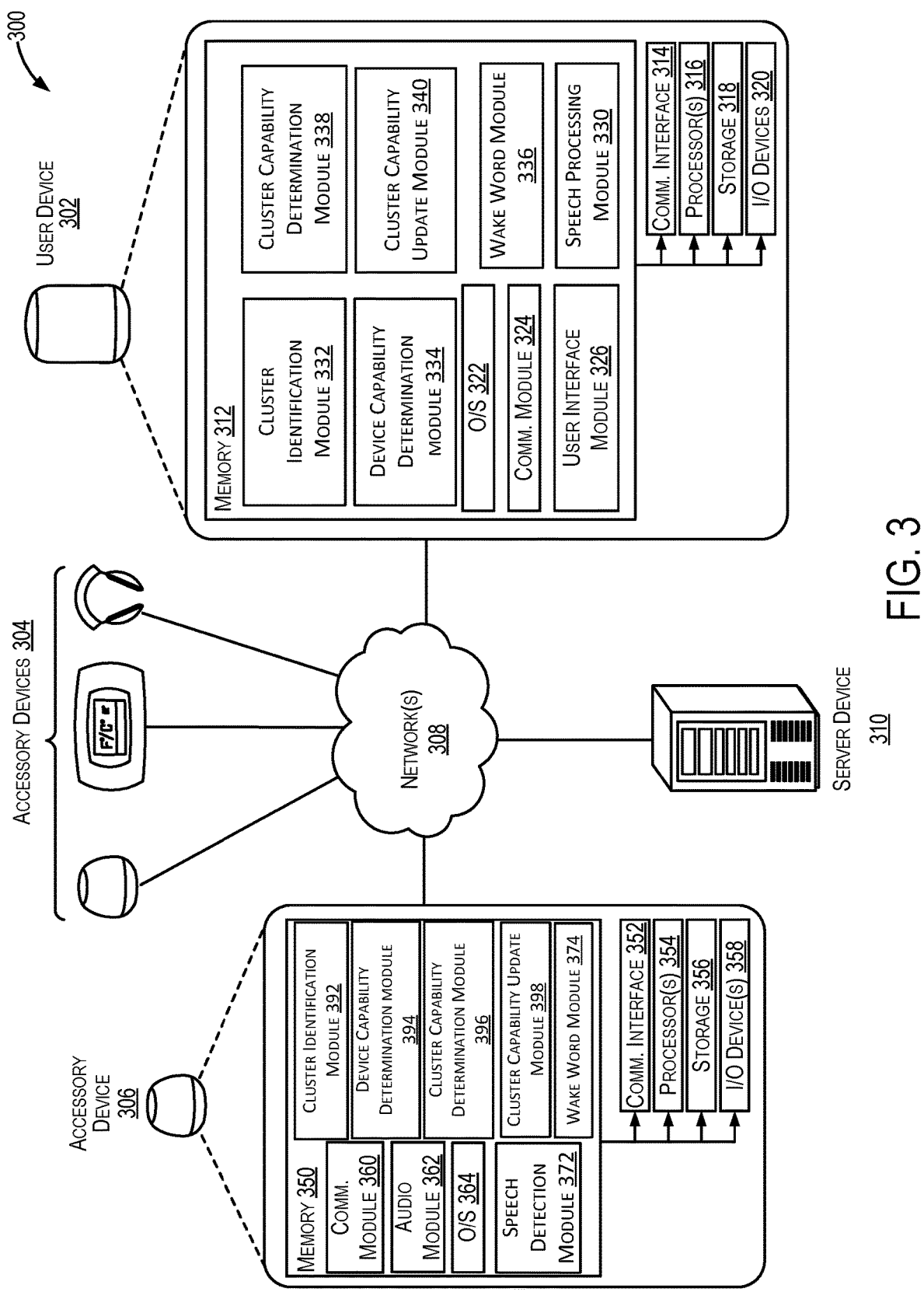
FIG. 3 is a simplified block diagram illustrating an example architecture of a system used to detect and act upon a user request, according to some embodiments.

FIG. 3 is a simplified block diagram 300 illustrating an example architecture of a system used to detect and act upon a user request, according to some embodiments. The diagram includes a representative user device 302, one or more accessory devices 304, a representative accessory device 306, one or more network(s) 308, and a server device. Each of these elements depicted in FIG. 3 may be similar to one or more elements depicted in other figures described herein. In some embodiments, at least some elements of diagram 300 may operate within the context of a home environment (e.g. the network environment 200 of FIG. 2).

The accessory devices 304 and representative accessory device 306 may be any suitable computing device (e.g., smart speaker, smartwatch, smart thermostat, camera, etc.). In some embodiments, an accessory device may perform any one or more of the operations of accessory devices described herein. Depending on the type of accessory device and/or location of the accessory device (e.g., within the home environment or outside the home environment), the accessory device may be enabled to communicate using one or more network protocols (e.g., a Bluetooth connection, a Thread connection, a Zigbee connection, a WiFi connection, etc.) and network paths over the network(s) 308 (e.g., including a LAN or WAN), described further herein.

In some embodiments, the server device 310 may be a computer system that comprises at least one memory, one or more processing units (or processor(s)), a storage unit, a communication device, and an I/O device. In some embodiments, the server device 310 may perform any one or more of the operations of server devices described herein. In some embodiments, these elements may be implemented similarly (or differently) than as described in reference to similar elements of user device 302.

In some embodiments, the representative user device 302 may correspond to any one or more of the user devices described herein. For example, the user device 302 may correspond to one or more of the user devices of the cluster of devices as illustrated in FIG. 2. The representative user device may be any suitable computing device (e.g., a mobile phone, tablet, a smart hub speaker device, a smart media player communicatively connected to a TV, etc.).

In some embodiments, the one or more network(s) 308 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 310 may be external to the home environment, and thus, communicate with other devices over the WAN.

As described herein, user device 302 may be representative of one or more user devices connected to one or more of the network(s) 308. The user device 302 has at least one memory 312, a communications interface 314, one or more processing units (or processor(s)) 316, a storage unit 318, and one or more input/output (I/O) device(s) 320.

Turning to each element of user device 302 in further detail, the processor(s) 316 may be implemented as appropriate in hardware, computer-executable instructions, firmware or combinations thereof. Computer-executable instruction or firmware implementations of the processor(s) 316 may include computer-executable or machine-executable instructions written in any suitable programming language to perform the various functions described.

The memory 312 may store program instructions that are loadable and executable on the processor(s) 316, as well as data generated during the execution of these programs. Depending on the configuration and type of user device 302, the memory 312 may be volatile (such as random access memory ("RAM")) or non-volatile (such as read-only memory ("ROM"), flash memory, etc.). In some implementations, the memory 312 may include multiple different types of memory, such as static random access memory ("SRAM"), dynamic random access memory ("DRAM") or ROM. The user device 302 may also include additional storage 318, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 318 may be utilized to store data contents received from one or more other devices (e.g., server device 310, other user devices, accessory devices 304, or the representative accessory device 306). For example, the storage 318 may store accessory management settings, accessory settings, and user data associated with users affiliated with the home environment.

The user device 302 may also contain the communications interface 314 that allows the user device 302 to communicate with a stored database, another computing device or server, user terminals, or other devices on the network(s) 308. The user device 302 may also include I/O device(s) 320, such as for enabling connection with a keyboard, a mouse, a pen, a voice input device, a touch input device, a display, speakers, a printer, etc. In some embodiments, the I/O devices(s) 320 may be used to output an audio response or other indication as part of executing the response to a user request.

The memory 312 may include an operating system 322 and one or more application programs or service user devices for implementing the features disclosed herein, including a communications module 324, a user interface module 326, a speech processing module 330, a cluster identification module 332, a device capability determination module 334, a cluster capability determination module 338, a cluster capability update module 340, and a wake word module 336.

The communications module 324 may comprise code that causes the processor(s) 316 to generate instructions and messages, transmit data, or otherwise communicate with other entities. As described herein, the communications module 324 may transmit messages via one or more network paths of network(s) 308 (e.g., via a LAN associated with the home environment or an Internet WAN).

The user interface module 326 may comprise code that causes the processor(s) 316 to present information corresponding to the accessory devices and user devices present within a home environment. For example, the user interface module 326 can present a graphical representation of user devices and the accessory devices currently associated with each accessory device. In some embodiments, the user interface module 326 can allow a user to provide configuration information about a new accessory device to be added to a home environment or allow the user to select user devices or accessory devices for removal from the home environment.

The speech processing module 330 can comprise code that causes the processor(s) 316 to receive and process an audio input corresponding to speech or other sound amenable to analysis by techniques described herein. Wake word module 336 can comprise code that causes processor(s) 316 to receive and process a portion of an audio input corresponding to a trigger or wake word. For example, wake word module 336 can analyze a portion of an audio input to determine the presence of a wake word. The speech processing module can also, in some embodiments, determine a language corresponding to the audio input and use that language to inform the analysis of the wake word portion.

The cluster identification module 332 can comprise code that causes the processor(s) 316 to identify a number of clusters in a network environment and identify devices included in each cluster. For instance, the cluster identification module 332 can identify a cluster associated with device 302 and whether the device 302 is a leader device for the cluster. The cluster identification module 332 can also identify other devices (e.g., one or more of accessory devices 304 or other devices on the network 308) in the cluster (e.g., by processing device identifying information, by identifying a location of each device in the network). Identifying the devices in each cluster can be utilized in generation of cluster capability data as described herein.

The device capability determination module 334 can comprise code that causes the processor(s) 316 to derive capabilities of the device (e.g., user device 302). The device capability determination module 334 can obtain device characteristics from various components of user device 302 (e.g., from O/S 322, Comm. Module 324, I/O devices 320). The device capability determination module 334 can process the obtained characteristics to derive capabilities of the device. For instance, processor(s) 316 data can be processed to determine average processing resources used by device 302 relative to a maximum processing capability of the device 302 to generate average available processing resources for the device 302. As another example, O/S 322 data can be processed to identify features of the device 302, applications capable of being executed on device 302, etc. The device capability information can be arranged in an ordered tuple for subsequent processing as described herein. Deriving a device capability is described in greater detail at block 422 of FIG. 4 or block 504 of FIG. 5 for example.

The cluster capability determination module 338 can comprise code that causes the processor(s) 316 to generate capability information for the cluster of user device. The cluster capability information can specify features or capabilities of all devices in the cluster. The cluster capability determination module 338 can obtain device capability data for all devices in a cluster (e.g., via Comm. Module 324) and arrange device capability data by capability type. While any user device can generate the capability information as described herein, in many instances, only leader devices for each cluster will generate the capability information for the cluster of devices.

The cluster capability determination module 338 can aggregate all capability data of the devices in the cluster to generate an overall cluster capability that can be used in selection of a cluster or a device in the cluster to process data provided by a service user device node. For example, aggregating capability data can include identifying available processing power for each device, identifying capabilities specific to each device (e.g., whether a device can output audio content, whether a device can stream video content), identifying device classes of devices in the clusters, etc. Generating a cluster capability is described in greater detail at block 428 of FIG. 4 or block 608 of FIG. 6, for example.

The cluster capability update module 340 can comprise code that causes the processor(s) 316 to update the cluster capability information responsive to a change to the devices in the cluster. Changes to the devices in the cluster can include an addition of a device in the network, a device leaving the cluster, a device obtaining new features (e.g., a software update), etc. The device 302 can detect update(s) to devices in the cluster by communicating with devices in the cluster (e.g., via Comm. module 324) and establishing connections with devices in the cluster. Dynamically updating cluster capability information is discussed in greater detail with respect to FIG. 6.

Turning now to the details of the representative accessory device 306, the accessory device 306 can have, in some embodiments, at least one memory 350, a communications interface 352, processor(s) 354, a storage unit 356, and I/O devices 358. As described herein with respect to the user device 302, these elements of the accessory device can have the same appropriate hardware implementations as their counterparts on the user device 302.

The memory 350 of the accessory device 306 can include an operating system 364 and one or more application programs or service user devices for implementing the features disclosed herein, including communications module 360, audio module 362, cluster identification module 392, device capability determination module 394, cluster capability determination module 396, cluster capability update module 398, speech detection module 372, and wake word module 374. As described herein with respect to the user device 302, the communications module 360 can have similar appropriate functionality as its counterpart communications module 324, the cluster identification module 392 can have similar appropriate functionality as its counterpart cluster identification module 332, device capability determination module 394 can have similar appropriate functionality as its counterpart device capability determination module 334, cluster capability determination module 396 can have similar appropriate functionality as its counterpart cluster capability determination module 340, cluster capability update module 398 can have similar appropriate functionality as its counterpart cluster capability update module 340, and wake word module 374 can have similar appropriate functionality as its counterpart wake word module 336.

The audio module 362 may comprise code that causes the processor(s) 354, in conjunction with the I/O devices 358, to receive, process, and transmit audio signals. For example, the audio module 362 can receive a user utterance or other audio input at a microphone with the I/O devices 358 and transmit that audio data to the user device 302 over a streaming audio channel or other suitable connection. The audio module 362 can also receive response audio from the user device 302 and play that audio at a speaker within the I/O devices 358.

Wake word module 374 can comprise code that causes processor(s) 354 to receive and process the wake word. For example, wake word module 374 can analyze a portion of an audio input to determine the presence of a wake word.

II. SELECTION OF A CLUSTER BASED ON CLUSTER CAPABILITY INFORMATION

Figure 4:
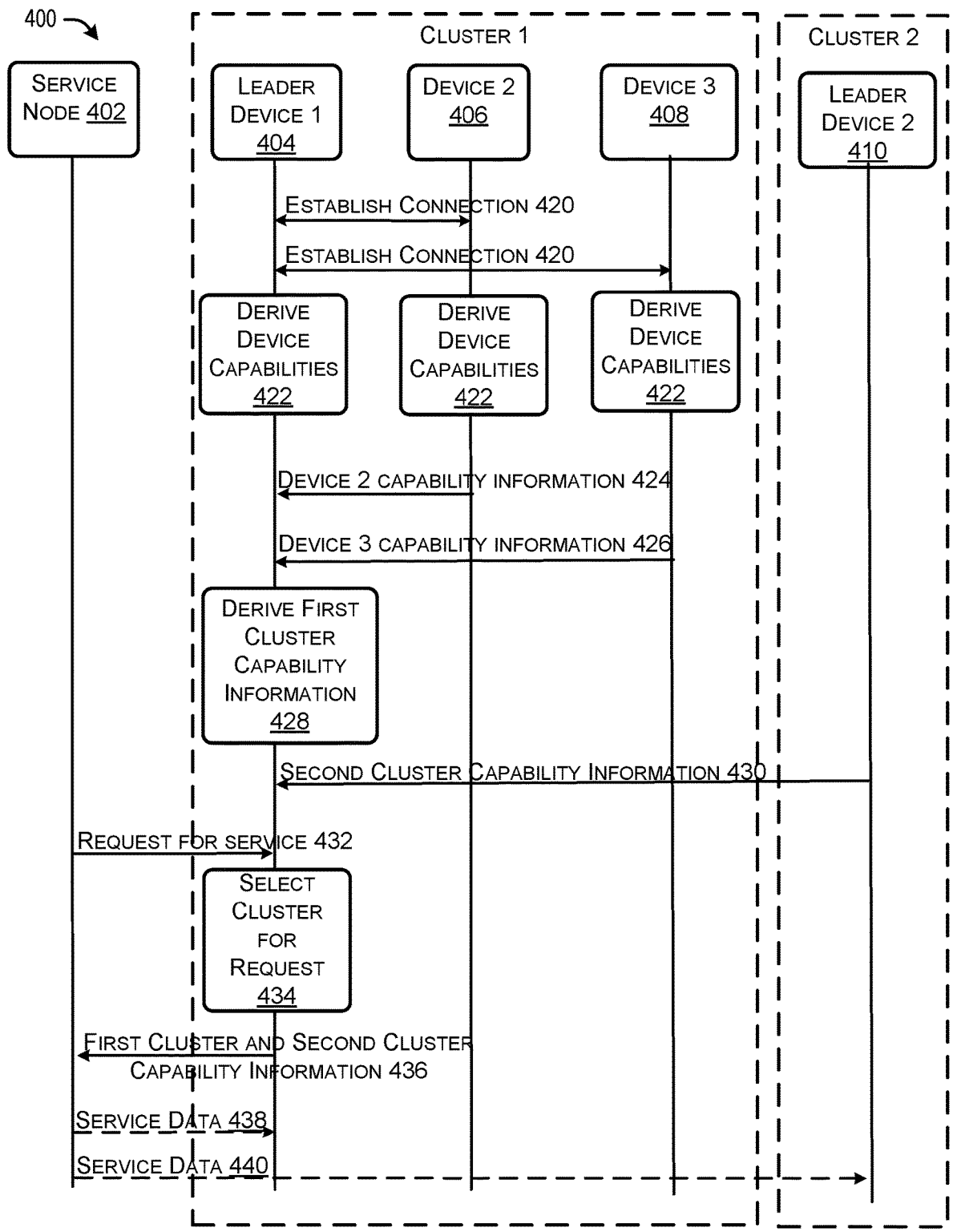
FIG. 4 illustrates an example signaling process for selection of a cluster for execution of a request using derived cluster capability information, according to some embodiments.

FIG. 4 illustrates an example signaling process 400 for selection of a cluster for execution of a request using derived cluster capability information. As shown in FIG. 4, a first cluster can include a service user device node (e.g., a service user device) 402, a leader device 1 404, and a number of other devices (e.g., device 2 406, device 3 408). The second leader device (e.g., leader device 2) 410 can include a leader device of a second cluster of devices in a network environment.

At block 420, the leader device 404 can establish a connection with devices in the cluster (e.g., devices 406, 408). For example, the leader device 404 can request data identifying device 2 406 and device 3 408 to establish a connection with devices 406, 408. The data provided from devices 406, 408 to the leader device 404 can include a device identifier, device class, device location, etc.

At block 422, each device in the first cluster (e.g., 404, 406, 408) can derive device capabilities. For example, the leader device 404 can derive device capability data specific to the device 404. Device capability data can include data identifying capabilities of each device. For example, the device capability data can specify a processing capability, a power capability, a network capability, a device class, a software version of the device, whether the device is battery powered (e.g., a power configuration), whether the device is configured for wired or wireless communication (e.g., a data communication configuration), etc. The device capability data can specify an application or software feature capability. As described in greater detail below, each device can obtain characteristics of the device and process the characteristics to derive capability data quantifying the capabilities of each device.

At blocks 424 and 426, device capabilities of the other devices in the cluster can be transmitted to the leader device 1 404. For example, device 2 406 and device 3 408 can each send respective device capability data to the leader device 404. The device capability information can comprise a series of values specifying the device capabilities and can be provided in an order based on data type (e.g., as an ordered tuple specifying an order of a processing capability, a power capability, a network capability, a device class, a software version of the device).

At block 428, the leader device 404 can derive a first cluster capability of the devices in the first cluster. The cluster capability can include an aggregate series of capabilities of all devices in the cluster, specifying features available to devices in the cluster, a maximum processing capacity, a maximum network throughput capacity, device types in the cluster, etc. The aggregated series of capabilities of the devices in the cluster can provide aggregated computing resources available for the devices in each cluster for performance of various processing tasks.

The aggregated capabilities for the devices in the cluster can provide an intersection of capabilities of the devices in the cluster. The intersection of capabilities can provide capabilities specific to each cluster. For instance, the intersection of capabilities can provide features (e.g., video streaming devices, devices capable of outputting audio, specific device types) unique to each cluster. In some instances, overlapping clusters of devices can have different intersections even if the clusters share a number of devices. The differing intersections can specify features specific to each cluster of devices and can be used to select a cluster for performing a task as described herein.

At block 430, the leader device 404 can obtain cluster capability data for the second cluster from the second leader device 410. The cluster capability data for the second cluster can include capability data specific to the devices in the second cluster and can differ from the capabilities of the first cluster. In some embodiments, leader device 404 can also be part of the second cluster and may only obtain capability data for the second cluster when the leader device 404 is part of the second cluster as well.

At block 432, the service user device 402 can provide a request for a service user device to the leader device 404. The request for the service user device can include a request to perform a processing task by one of the clusters. As an illustrative example, the request can include a request provided by a computing device external to the network environment to request a video stream from a device in a 4K (3840×2160 pixel) resolution.

At block 434, the leader user device 404 can determine a cluster based on the request. The leader user device can process the request for a service user device from the service user device node and identify a series of parameters specific to the request. The parameters can specify a requested data type (e.g., video, audio), a requested processing power of devices in the network, a requested network throughput capability of devices in the network, etc. In the example of a request requesting a video stream from a device in a 4K (3840×2160 pixel), the leader device 1 404 can compare cluster capability information for each cluster to determine that the second cluster has a device capable of streaming a video in the 4K resolution. In response, the leader user device 404 can forward the second cluster capability information to the service user device as described in block 436 below.

In some embodiments, selecting a cluster can include comparing the parameters of the request with data types included in the cluster capability information. For example, each data type (e.g., applications executing on devices in each cluster, available processing resources on devices in each cluster) can be assigned a ranking relative to other clusters in the network. The cluster capability information for each cluster can be processed to determine whether the capability information is within a threshold similarity to a requested parameter as specified in the request. A number of data types of the device capability information can be processed to select a cluster specific to each request provided by a service user device.

In some embodiments, the cluster capability data can indicate whether a capability is available or not. For example, a cluster can include four devices registering a "Mono Audio Output" capability and two devices registering a "Stereo Audio Output" capability. For the cluster of four devices, the "Mono Audio Output" capability would be available and the "Stereo Audio Output" Capability would not be available in the cluster capability data. However, if a secondary cluster was composed of just the two devices registering the "Stereo Audio Output" capability, that second cluster would have the "Stereo Audio Output" Capability as part of the cluster capability data.

At block 436, the leader user device 404 can send the first cluster capability information and/or the second cluster capability information to the service user device 402. The leader user device 404 can send either the first cluster capability information and/or the second cluster capability information to the service user device 402 based on the determination of a cluster as recited in block 434.

At block 438, the data can be provided to the first cluster via the leader device 404. The data can be sent to the leader device 404 responsive to the leader device selecting the first cluster for execution of the request in block 434.

At block 440, the data can be provided to the second leader device 410 for performance of the request at the second cluster. The data can be sent to the second leader device 410 responsive to the leader device selecting the second cluster for execution of the request in block 434.

Figure 5:
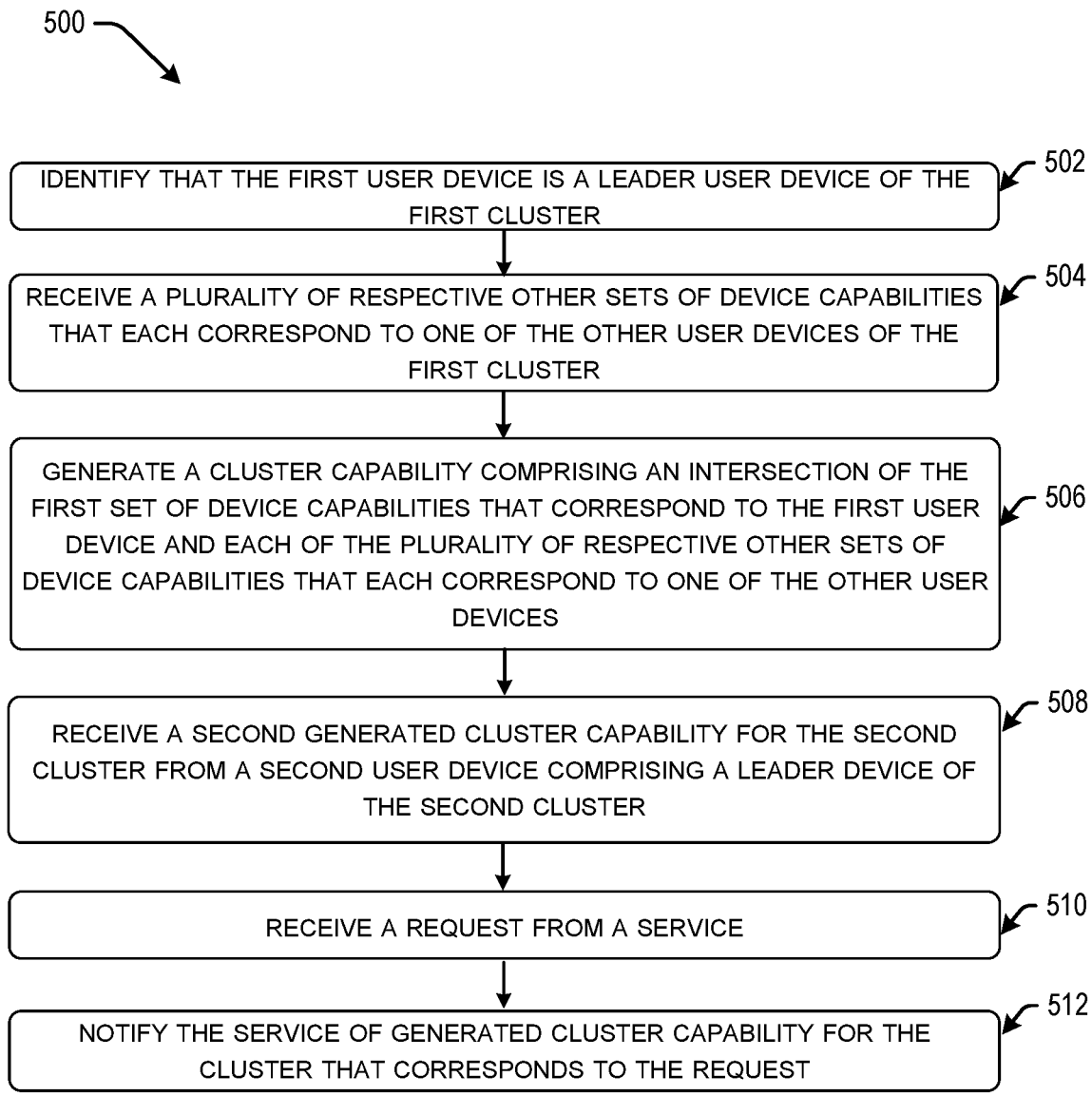
FIG. 5 is a block diagram illustrating a method for generating capabilities of device clusters with overlapping capabilities.

FIG. 5 is a block diagram 500 illustrating a method for generating capabilities of device clusters with overlapping capabilities. In many instances, one or more devices can be common to multiple clusters. In such instances, cluster capability information can include overlapping intersections of capabilities of devices in each cluster. The overlapping intersections can specify capabilities unique to each cluster that can be used to select a cluster to perform a task.

At block 502, the first user device can identify that the first user device is a leader user device of the first cluster. The first user device can also identify a plurality of user devices in a first cluster in a network. Further, at least one common user device can be included in both a first cluster and a second cluster.

For example, a device with a speaker can be included in both the first cluster and second cluster. However, in this example, the device with the speaker can only output audio response to an instruction from device(s) in the first cluster. For instance, the device may be able to play both stereo and mono audio, and another device in the first cluster can be associated with mono audio. Accordingly, the intersection of the first cluster can be associated with mono audio. Further, if devices in the second cluster are associated with stereo, the second intersection of the first cluster can be associated with stereo audio.

At block 504, the first user device can receive a plurality of respective other sets of device capabilities that each correspond to one of the other user devices of the first cluster. The device capabilities can specify computing capabilities or other software features of devices in the cluster.

At block 506, the first user device can generate a cluster capability comprising an intersection of the first set of device capabilities that correspond to the first user device and each of the plurality of respective other sets of device capabilities that each correspond to one of the other user devices.

At block 508, the first user device can receive a second generated cluster capability for the second cluster from a second user device comprising a leader device of the second cluster. The second cluster can include a second intersection of the second set of device capabilities that correspond to the second user device and each of the plurality of respective other sets of device capabilities that each correspond to one of the other user devices in the second cluster. The capability information for each cluster can include different intersections of capabilities of the devices in each cluster. For example, as noted above, the device with the speaker can only output audio content when a request for output is sent to the cluster that includes "audio output" as a capability. While the speaker is capable of outputting, it may be restricted from doing so in a cluster that does not have that capability (e.g., based on the intersection of one cluster being different from the intersection of another cluster).

At block 510, the first user device can receive a request from a service user device (e.g., a controller). This can include a request from a mobile device to play audio content on a speaker of a device in the network environment, for example.

At block 512, the first user device can notify the service user device of generated cluster capability for the cluster that corresponds to the request. For example, the overlapping intersections of the clusters can be compared with the request to identify that the first cluster is to perform the request. The first cluster can be selected because the device with the speaker common to both clusters is capable of outputting audio content when interacting with devices in the first cluster, as is specified in the cluster capability information for the first cluster.

III. DYNAMIC UPDATING OF CLUSTER CAPABILITY DATA

Figure 6:
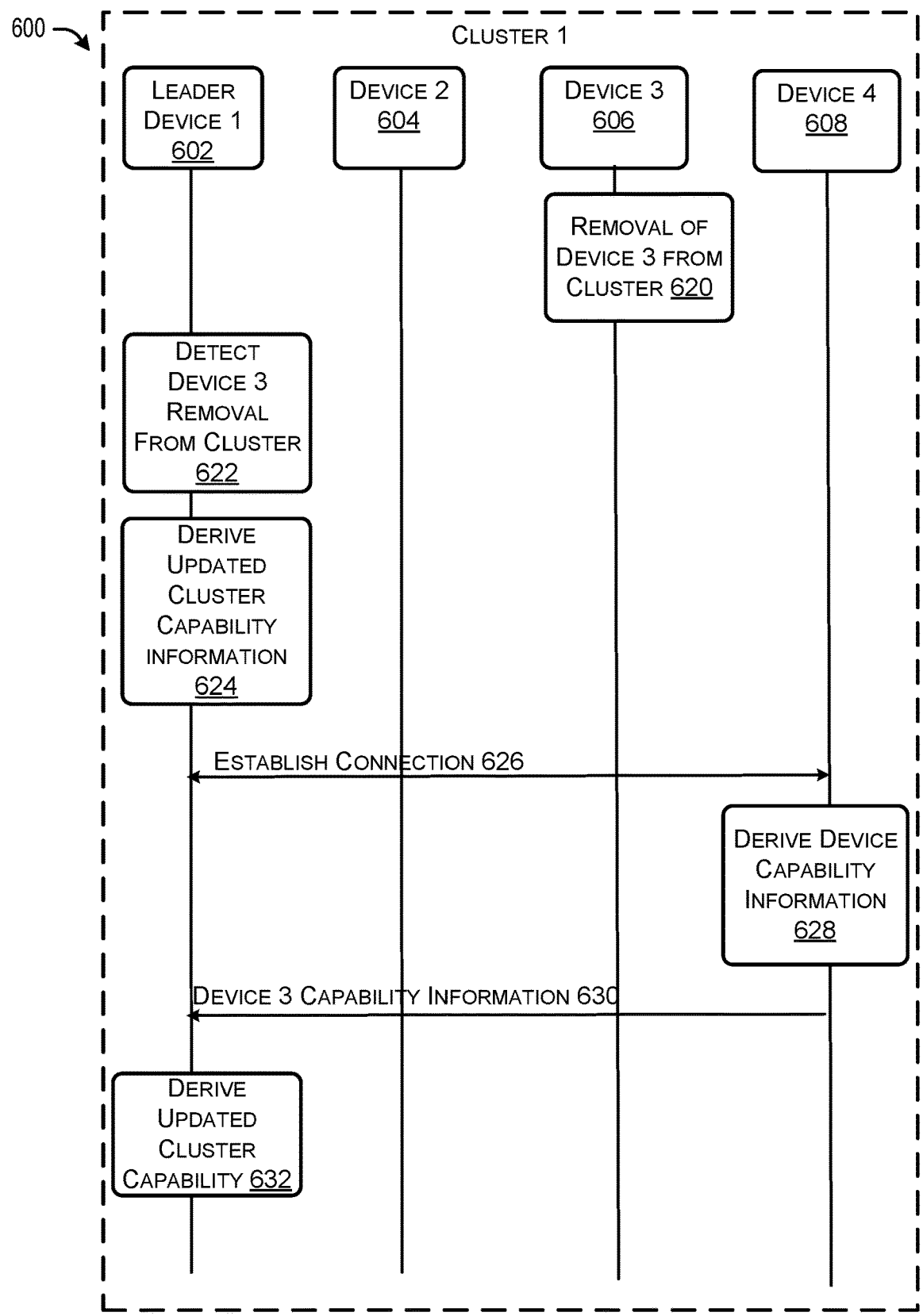
FIG. 6 illustrates an example signaling reprocess for updating cluster capability data based on devices leaving/entering a cluster, according to some embodiments.

FIG. 6 illustrates an example signaling reprocess 600 for updating cluster capability data based on devices leaving/entering a cluster. As noted above, in many instances, devices in a cluster can be ephemeral in nature and may leave the network environment or enter the network environment. Additionally, some devices may lose connectivity, be completely removed from a user's network, or be added to the network as new devices. The cluster capability information can be dynamically updated as the devices are added/removed from the cluster, thereby increasing the accuracy in cluster capabilities for selection of a cluster to perform requests.

In some embodiments, a device in a cluster can register and/or unregister capabilities at any time. In these embodiments, the leader device for the cluster can be notified of the capability changes and can compute new cluster capability data for the cluster. If the intersection of capabilities is modified, a notification of the new set of available capabilities is sent to the devices in the cluster.

At block 620, a device (e.g., device 3 606) can be removed from the cluster. For example, device 606 can include a mobile device that is outside a communication range of the other devices in the cluster. In this example, the device is no longer capable of communicating with other devices in the cluster, and accordingly, the overall capability for the cluster is changed.

At block 622, the leader device 602 can detect that device 3 606 is removed from the cluster. The leader device 602 can obtain an indication that the device 3 606 is no longer in the cluster or the leader device 602 can detect a time period of inactivity from the device 3 606, for example.

At block 624, the leader device 602 can derive an updated cluster capability for the cluster. The updated cluster capability can include an overall capability of the devices in the cluster without the capability data relating to device 3 606. The leader device 602 can derive the updated cluster capability similar to the process as described in block 428.

As an illustrative example, a calculated intersection of capabilities can be calculated for a cluster of devices. In this example, a device that is not capable of processing 4K video can be removed from the cluster. Subsequent to detecting that the device is removed from the cluster, the intersection of capabilities can be re-calculated for a cluster of devices. For example, the updated intersection of capabilities can specify that all devices are capable of processing 4K video. Accordingly, an updated intersection can include 4K video processing as part of the capabilities of the cluster.

In some embodiments, a new device (e.g., device 4 608) can be introduced to the cluster. For example, the device 4 608 can be registered to the cluster, powered on, or otherwise within a communication range of devices in the cluster. At block 626, the leader device 602 can establish a connection with newly entered device 4 608. Establishing the connection with the new device can include obtaining data specific to new device 4 608.

At block 628, the new device 608 can derive device capabilities of the device. The new device 608 can identify capabilities of the device and generate the device capability information as specified herein (e.g., at block 422 in FIG. 4).

At block 630, the leader device 602 can receive the device capabilities of the new device from the new device 608. At block 632, the leader device can derive an updated cluster capability. The updated cluster capability can include an intersection of the first set of device capabilities that correspond to the first user device and each of the plurality of respective other sets of device capabilities that each correspond to one of the other user devices as well as the new user device. The updated cluster capability information can take into account the new device capabilities to identify capabilities of all devices in the cluster.

For example, responsive to new device 608 being added to the network, the intersection can be re-calculated to identify capabilities of the cluster. For example, if the new device 608 can process 4K video and the other devices in the cluster can process 4K video, the re-calculated intersection can specify that 4K video can be processed by all devices in the cluster.

IV. EXAMPLE METHOD FOR DERIVING DEVICE CLUSTER CAPABILITY INFORMATION FOR A CLUSTER OF DEVICES IN A NETWORK ENVIRONMENT

Figure 7:
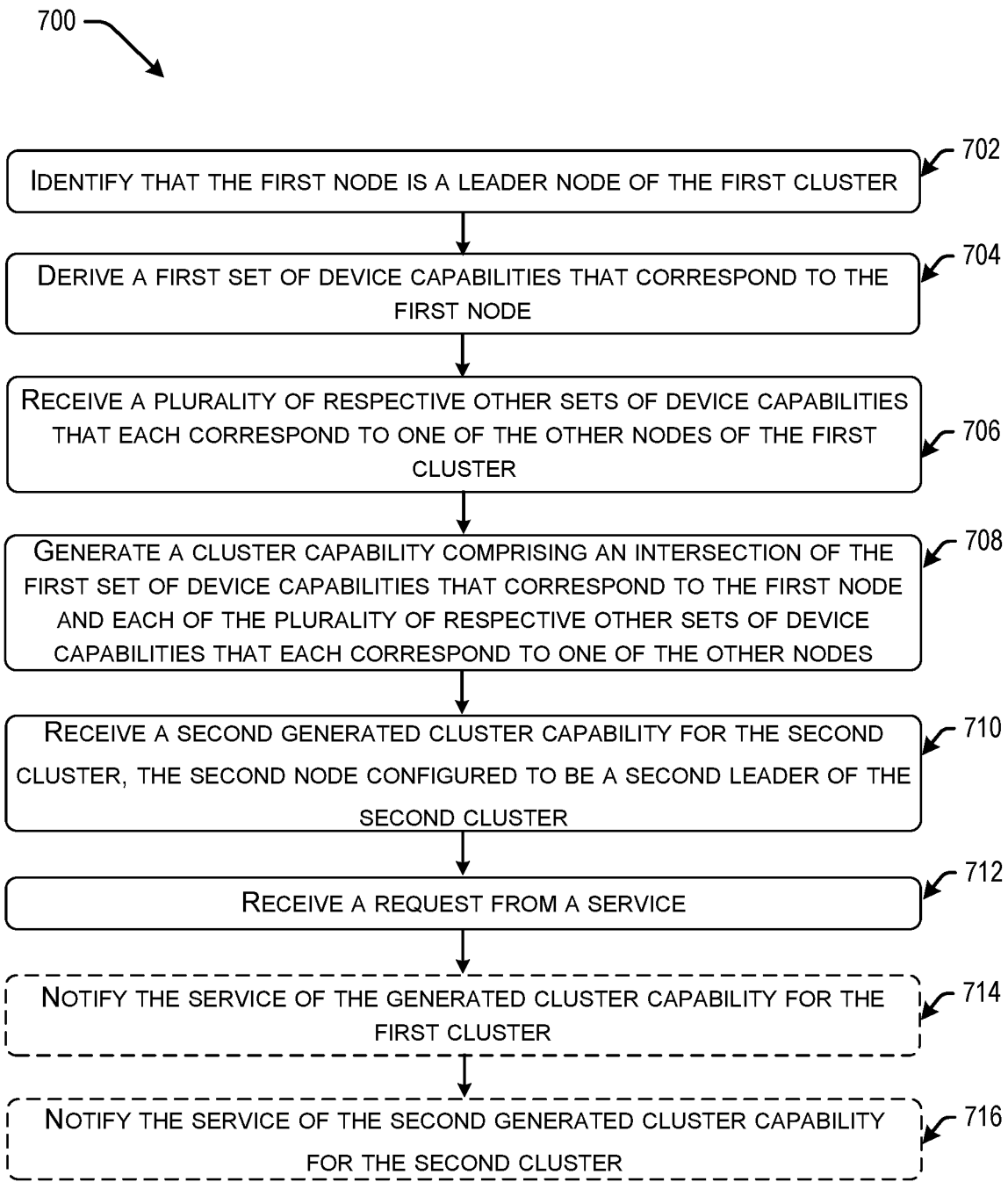
FIG. 7 is a block diagram illustrating an example method for deriving device cluster capability information for a cluster of devices in a network environment, according to some embodiments.

FIG. 7 is a block diagram 700 illustrating an example method for deriving device cluster capability information for a cluster of devices in a network environment. A first user device can be included in a plurality of user devices in a first cluster of a plurality of clusters in a network. The first user device can also be part of a second cluster of the plurality of clusters in the network.

At block 702, the first user device can identify that the first user device is a leader user device of the first cluster. As described herein, the leader user device can generate the cluster capability information for devices in the cluster. The user devices in the first cluster can include network-accessible devices (e.g., mobile phone, computing device, IoT device) that are disposed within a first region of a network environment (e.g., a room or zone within a network), and user devices in the second cluster can include network-accessible devices that are disposed within a second region of a network environment. Zones can include multiple rooms, or areas of a building that are not defined as rooms. For example, a "security" zone might include all the devices that are configured to manage home security and may not be in a specific room (e.g., a smart doorbell, a front porch light, a light in the foyer/entryway, a video camera, and/or a speaker in a bedroom (e.g., as part of an intercom system or the like)). Zones can also include wide areas of an environment that are also not room-specific (e.g., an "upstairs" zone, a "downstairs" zone, a "patio" zone, or the like). As such, clusters can be identified as devices within a room, within a zone, within an area, and/or within a portion of a room. Additionally, a cluster may be just a set of devices that have been grouped together (e.g., a service user device group) by functionality (e.g., a turntable, amplifier, FM radio, and a set of speakers can all be included in a single cluster).

At block 704, the first user device can derive a first set of device capabilities that correspond to the first user device. The first set of device capabilities can specify various capabilities of the first user device. For instance, deriving the first set of device capabilities can include identifying a series of features unique to the first user device, identifying types of data capable of being outputted by the first user device, determining a power metric indicative of a power capacity of the first user device, determining a network metric indicative of a data transmission capability of the first user device, and determining a processing metric indicative of a processing capability of the first user device. The first set of device capabilities can also specify various applications executing on the user device or a set of software features specific to the device type of the first user device.

For example, applications executing on the user device can include audio recording applications, video output applications, doorbell triggering applications, etc. As another example, software features specific to device types can specify devices with audio output capabilities, video output capabilities, text display capabilities, smart home control capabilities (e.g., devices capable of modifying thermostat settings), etc.

At block 706, the first user device can receive a plurality of respective other sets of device capabilities that each correspond to one of the other user devices of the first cluster from other user devices of the first cluster. In some instances, each of the other user devices in the first cluster derives each set of device capabilities that is included in the plurality of respective other sets of device capabilities. In other instances, the leader user device obtains device data relating to each user device in the cluster of user devices and generates the device capabilities for each user device based on the obtained device data.

At block 708, the first user device can generate a cluster capability comprising an intersection of the first set of device capabilities that correspond to the first user device and each of the plurality of respective other sets of device capabilities that each correspond to one of the other user devices. The cluster capability can provide capabilities of the devices in the cluster. In some embodiments, the first user device can transmit the generated cluster capability to each of the other user devices of the first cluster.

The intersection of device capabilities can be calculated using derived capabilities of all devices in the cluster. For instance, the intersection can provide a listing identifying capabilities of the devices in the cluster (e.g., identifying all devices that can process 4K video data). In some instances, the intersection can provide all capabilities of the devices in the cluster that can identify features unique to the devices in the cluster. For example, the intersection can indicate devices that can output stereo audio, that a first device can process 4K video, etc.

In some instances, the cluster capability can be updated responsive to a change to the devices in the cluster. For example, the first user device can detect that a user device is no longer included in the first cluster. The first user device can derive an updated cluster capability without device capabilities relating to the user device no longer being included in the first cluster. The first user device can notify the service user device of the updated cluster capability for the first cluster.

As another example, the first user device can detect that a new user device is included in the first cluster. The first user device can receive device capabilities relating to the new user device and derive an updated cluster capability that includes the device capabilities relating to the new user device. The first user device can notify the service user device of the updated cluster capability for the first cluster.

At block 710, the first user device can receive a second generated cluster capability for the second cluster from a second user device in the second cluster. The second user device can be configured to be a second leader of the second cluster. The second generated cluster capability for the second cluster can specify capabilities unique to the devices of the second cluster.

As noted above, in some instances, at least one device can be common to both the first cluster and second cluster. In these instances, the generated cluster capabilities for each cluster can differ despite including a common device. For example, an audio device in two separate clusters has both stereo and mono audio output capabilities. In this example, the device may be included in a first cluster with three other devices, where one is stereo and the other two are mono. For the first cluster, the intersection would specify "mono," so this device would be associated with "mono" for this cluster. However, the device may also be in a second cluster, where all of the other devices in the second cluster have stereo capabilities. In this case, the device that is associated with "mono" in the first cluster would be associated with "stereo" in the second cluster.

At block 712, the first user device can receive a request from a service user device. The request can provide various parameters for performance of a task by at least one user device. The service user device, as a result of getting capability availability information for one or more clusters can decide to which cluster it wishes to direct the request.

In some embodiments, at block 714, the first user device can notify the service user device of the generated cluster capability for the second cluster. Notifying the service user device of the generated cluster capability can be performed in accordance with the request corresponding to the first cluster.

In some instances, the set of parameters can be compared with the generated cluster capability for the first cluster and the generated cluster capability for the first cluster to determine whether the first cluster or second cluster corresponds to the set of parameters. Determining whether the first cluster or second cluster corresponds to the set of parameters can include identifying similarities between the parameters of the request with capabilities of each cluster. The service user device can be notified of the generated cluster capability for the first cluster responsive to determining that the generated cluster capability for the first cluster corresponds with the set of parameters. Alternatively, the service user device can be notified of the generated cluster capability for the second cluster responsive to determining that the generated cluster capability for the second cluster corresponds with the set of parameters.

In some embodiments, at block 716, the first user device can notify the service user device of the second generated cluster capability for the second cluster. The notification can be performed in accordance with the request corresponding to the second cluster.

Figure 8:
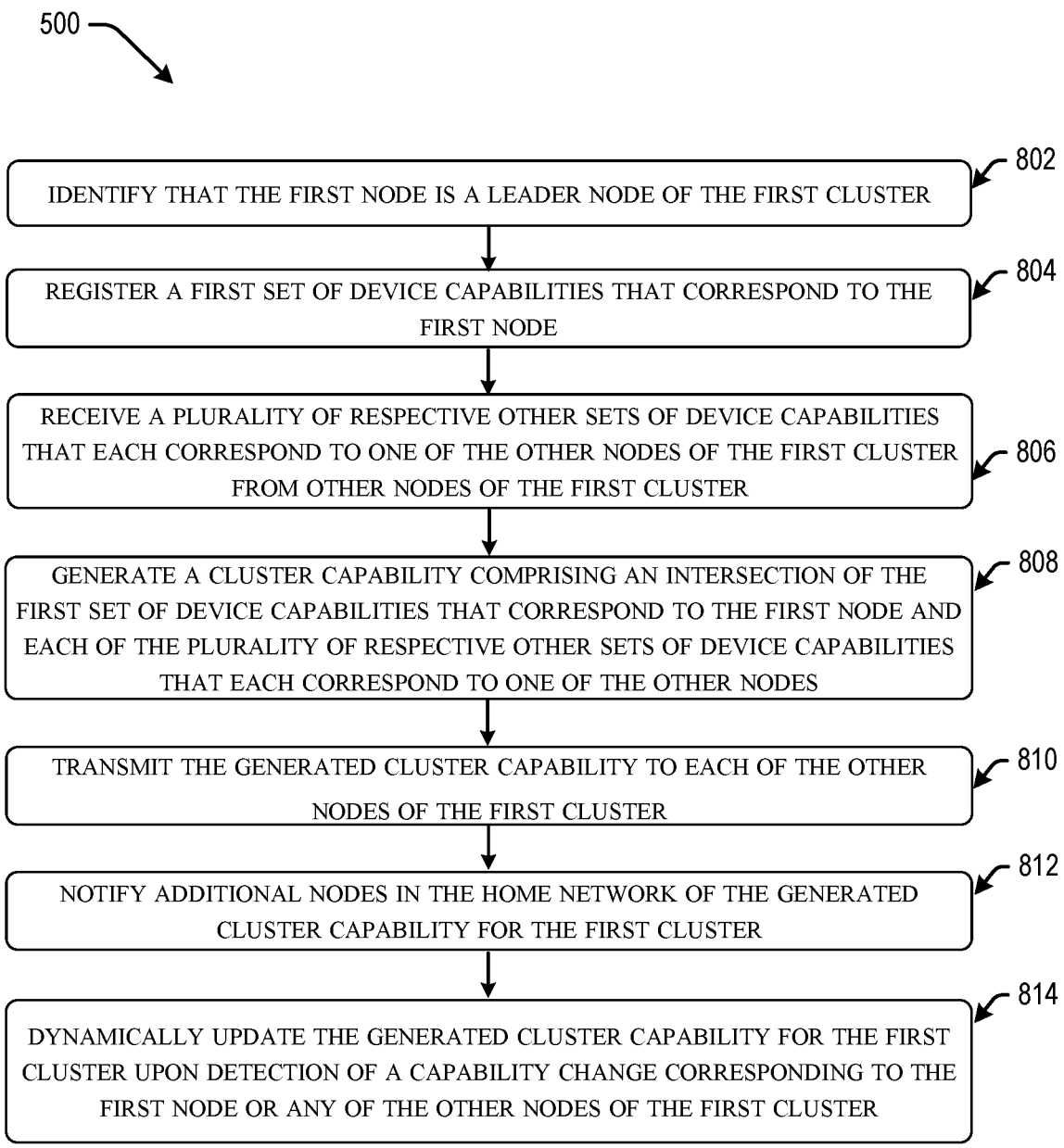
FIG. 8 is a block diagram illustrating a process for dynamically updating generated cluster capabilities for a cluster of devices in a network.

FIG. 8 is a block diagram 800 illustrating a process for dynamically updating generated cluster capabilities for a cluster of devices in a network.

At block 802, the first node can identify that the first node is a leader node of the first cluster. The first node can be included in a plurality of nodes in a first cluster of a plurality of clusters in a network. At least one node of the plurality of nodes in the first cluster can also be part of a second cluster of the plurality of clusters in the network.

At block 804, the first node can register a first set of device capabilities that correspond to the first node. The first set of device capabilities that correspond to the first node can identify capabilities unique to the first device (e.g., software features, data output types, available processing resources)

At block 806, the first node can receive a plurality of respective other sets of device capabilities that each correspond to one of the other nodes of the first cluster from other nodes of the first cluster. At block 808, the first node can generate a cluster capability comprising an intersection of the first set of device capabilities that correspond to the first node and each of the plurality of respective other sets of device capabilities that each correspond to one of the other nodes.

At block 810, the first node can transmit the generated cluster capability to each of the other nodes of the first cluster. The other nodes in the first cluster can obtain the cluster capability in case another device can be selected as a leader device if the first node leaves the network. In this instance, the cluster capability can be re-calculated by the new leader device without the capabilities of the first node.

At block 812, the first node can notify additional nodes in the network of the generated cluster capability for the first cluster. For instance, other leader devices in the network can obtain the generated cluster capability for the first cluster that can be used for selection of a cluster to perform specific processing tasks.

At block 814, the first node can dynamically update the generated cluster capability for the first cluster upon detection of a capability change corresponding to the first node or any of the other nodes of the first cluster. The capability change can include any of an addition of a new device to the cluster, a removal of a device to the cluster, new software features being available to device(s) in the network (e.g., in a software update), etc.

In some examples, a method is disclosed, where the method comprises identifying, by a first node of a plurality of nodes in a first cluster of a plurality of clusters in a network, that the first node is a leader node of the first cluster, wherein at least one node of the plurality of nodes in the first cluster is also part of a second cluster of the plurality of clusters in the network, registering, by the first node, a first set of device capabilities that correspond to the first node, receiving, from other nodes of the first cluster, a plurality of respective other sets of device capabilities that each correspond to one of the other nodes of the first cluster, generating, by the first node, a cluster capability comprising an intersection of the first set of device capabilities that correspond to the first node and each of the plurality of respective other sets of device capabilities that each correspond to one of the other nodes, transmitting, by the first node, the generated cluster capability to each of the other nodes of the first cluster, notifying, by the first node, additional nodes in the network of the generated cluster capability for the first cluster, and dynamically updating the generated cluster capability for the first cluster upon detection of a capability change corresponding to the first node or any of the other nodes of the first cluster.

V. CONCLUSION

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed blocks for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA), whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery service user devices, the present technology can be configured to allow users to select to "opt in" or "opt out" of participation in the collection of personal information data during registration for service user devices or anytime thereafter. In another example, users can select not to provide mood-associated data for targeted content delivery service user devices. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery service user devices.

The various embodiments further can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle °, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, service user devices or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by the system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    identifying, by a first user device of a plurality of user devices in a first cluster of a plurality of clusters in a network, that the first user device is a leader user device of the first cluster, wherein at least the first user device is also part of a second cluster of the plurality of clusters in the network;
    deriving, by the first user device, a first set of device capabilities that correspond to the first user device;
    receiving, from other user devices of the first cluster, a plurality of respective other sets of device capabilities that each correspond to one of the other user devices of the first cluster;
    generating, by the first user device, a cluster capability comprising an intersection of the first set of device capabilities that correspond to the first user device and each of the plurality of respective other sets of device capabilities that each correspond to one of the other user devices;
    receiving, from a second user device in the second cluster, a second generated cluster capability for the second cluster, the second user device configured to be a second leader of the second cluster;
    receiving, by the first user device, a request from a service user device;
    in accordance with the request corresponding to the first cluster:
        notifying, by the first user device, the service user device of the generated cluster capability for the first cluster; and
    in accordance with the request corresponding to the second cluster:
        notifying, by the first user device, the service user device of the second generated cluster capability for the second cluster.

2. The method of claim 1, wherein deriving the first set of device capabilities further comprises:
    identifying, by the first user device, a series of features unique to the first user device;
    identifying, by the first user device, types of data capable of being outputted by the first user device;
    determining, by the first user device, a power metric indicative of a power capacity of the first user device;
    determining, by the first user device, a network metric indicative of a data transmission capability of the first user device; and
    determining, by the first user device, a processing metric indicative of a processing capability of the first user device.

3. The method of claim 1, wherein each of the other user devices in the first cluster derive each set of device capabilities that is included in the plurality of respective other sets of device capabilities.

4. The method of claim 1, further comprising:
    detecting, by the first user device, that a user device is no longer included in the first cluster;
    deriving, by the first user device, an updated cluster capability without device capabilities relating to the user device no longer being included in the first cluster; and
    notifying, by the first user device, the service user device of the updated cluster capability for the first cluster.

5. The method of claim 1, further comprising:
    detecting, by the first user device, that a new user device is included in the first cluster;
    receiving, by the first user device from the new user device, device capabilities relating to the new user device;
    deriving, by the first user device, an updated cluster capability that includes the device capabilities relating to the new user device; and
    notifying, by the first user device, the service user device of the updated cluster capability for the first cluster.

6. The method of claim 1, wherein the request from the service user device includes a set of parameters for performance of the request, the method further comprising:
    comparing the set of parameters with the generated cluster capability for the first cluster and the generated cluster capability for the second cluster to determine whether the first cluster or second cluster corresponds to the set of parameters, wherein:
        the service user device is notified of the generated cluster capability for the first cluster responsive to determining that the generated cluster capability for the first cluster corresponds with the set of parameters; or
        the service user device is notified of the generated cluster capability for the second cluster responsive to determining that the generated cluster capability for the second cluster corresponds with the set of parameters.

7. The method of claim 1, wherein user devices in the first cluster comprise network-accessible devices that are disposed within a first region of a network environment, and user devices in the second cluster comprise network-accessible devices that are disposed within a second region of a network environment.

8. The method of claim 1, further comprising:
    transmitting, by the first user device, the generated cluster capability to each of the other user devices of the first cluster.

9. A non-transitory computer-readable storage medium having stored thereon computer-executable instructions that, when executed by a processor of a first user device, cause the processor to perform operations comprising:
    identifying that the first user device is a leader user device of a first cluster, wherein the first user device is of a plurality of user devices in the first cluster of a plurality of clusters in a network, and wherein at least the first user device is also part of a second cluster of the plurality of clusters in the network;
    deriving a first set of device capabilities that correspond to the first user device;
    receiving, from other user devices of the first cluster, a plurality of respective other sets of device capabilities that each correspond to one of the other user devices of the first cluster;
    generating a cluster capability comprising an intersection of the first set of device capabilities that correspond to the first user device and each of the plurality of respective other sets of device capabilities that each correspond to one of the other user devices;

receiving, from a second user device in the second cluster, a second generated cluster capability for the second cluster, the second user device configured to be a second leader of the second cluster;

receiving, by the first user device, a request from a service user device;

in accordance with the request corresponding to the first cluster:
notifying, by the first user device, the service user device of the generated cluster capability for the first cluster; and in accordance with the request corresponding to the second cluster:
notifying, by the first user device, the service user device of the second generated cluster capability for the second cluster.

10. The non-transitory computer-readable storage medium of claim 9, wherein the computer-executable instructions, when executed by the processor of the first user device, further cause the processor to perform operations comprising:
receiving a number of respective cluster capabilities of other clusters in the network;
processing characteristics specified in the request to select a cluster with a generated cluster capability that corresponds to the characteristics specified in the request; and
forwarding the cluster capability of the selected cluster responsive to selecting the cluster.

11. The non-transitory computer-readable storage medium of claim 10, wherein the computer-executable instructions, when executed by the processor of the first user device, further cause the processor to perform operations comprising:
transmitting the generated cluster capability to each of the other user devices of the first cluster.

12. The non-transitory computer-readable storage medium of claim 10, wherein the generated cluster capability for the first cluster specifies a number of features capable of being performed by devices in the first cluster and a number of applications executing on the devices in the first cluster.

13. The non-transitory computer-readable storage medium of claim 10, wherein the computer-executable instructions, when executed by the processor of the first user device, further cause the processor to perform operations comprising:
detecting that a new user device is included in the first cluster;
receiving, from the new user device, device capabilities relating to the new user device;
deriving an updated cluster capability that includes the device capabilities relating to the new user device; and
notifying the service user device of the updated cluster capability for the first cluster.

14. The non-transitory computer-readable storage medium of claim 10, wherein the computer-executable instructions, when executed by the processor of the first user device, further cause the processor to perform operations comprising:
detecting that a second user device in the first cluster includes at least one new capability;
receiving updated device capabilities from a second user device in the first cluster that has at least one new capability;
deriving an updated cluster capability that includes the at least one new capability; and
notifying the service user device of the updated cluster capability for the first cluster.

15. A first user device included in a first cluster of user devices to select a cluster to perform a request based on cluster capability information for clusters of user devices in a network, the first user device comprising:
a memory configured to store computer-executable instructions; and
a processor configured to connect to the memory and execute the computer-executable instructions to at least:
identify that the first user device is a leader user device of the first cluster, wherein the first user device is of a plurality of user devices in a first cluster of a plurality of clusters in a network, and wherein at least the first user device is also part of a second cluster of the plurality of clusters in the network;
derive a first set of device capabilities that correspond to the first user device;
receive, from other user devices of the first cluster, a plurality of respective other sets of device capabilities that each correspond to one of the other user devices of the first cluster;
generate a cluster capability comprising an intersection of the first set of device capabilities that correspond to the first user device and each of the plurality of respective other sets of device capabilities that each correspond to one of the other user devices;
receive, from a second user device in the second cluster, a second generated cluster capability for the second cluster, the second user device configured to be a second leader of the second cluster;
receive a request from a service user device;
in accordance with the request corresponding to the first cluster:
notifying, by the first user device, the service user device of the generated cluster capability for the first cluster; and
in accordance with the request corresponding to the second cluster:
notifying, by the first user device, the service user device of the second generated cluster capability for the second cluster.

16. The first user device of claim 15, wherein the cluster capability identifies a series of features unique to devices in the first cluster, a series of applications executing on the devices in the first cluster, a power metric indicative of a power capacity of the devices in the first cluster, a network metric indicative of a data transmission capability of the devices in the first cluster, a processing metric indicative of a processing capability of the devices in the first cluster, a software version of the devices in the first cluster, a power configuration of each device in the first cluster, and a data communication configuration of each device in the first cluster.

17. The first user device of claim 15, wherein the processor is configured to connect to the memory and further execute the computer-executable instructions to at least:
detect that a second user device is no longer included in the first cluster;
remove any capabilities relating to the second user device from the cluster capability;
derive an updated cluster capability without device capabilities relating to the second user device no longer being included in the first cluster; and
notify the service user device of the updated cluster capability for the first cluster.

18. The first user device of claim 15, wherein the processor is configured to connect to the memory and further execute the computer-executable instructions to at least:
- detect that a new user device is included in the first cluster;
- receive, from the new user device, device capabilities relating to the new user device;
- derive an updated cluster capability that includes the device capabilities relating to the new user device; and
- notify the service user device of the updated cluster capability for the first cluster.

19. The first user device of claim 15, wherein the processor is configured to connect to the memory and further execute the computer-executable instructions to at least:
- receive a number of respective cluster capabilities of other clusters in the network;
- process characteristics, specified in the request to select a cluster with a generated cluster capability, that correspond to the characteristics specified in the request; and
- forward the generation cluster capability of the selected cluster responsive to selecting the cluster.

20. The first user device of claim 19, wherein the processor is configured to connect to the memory and further execute the computer-executable instructions to at least:
- transmit the generated cluster capability to each of the other user devices of the first cluster.

* * * * *